United States Patent Office 3,489,582
Patented Jan. 13, 1970

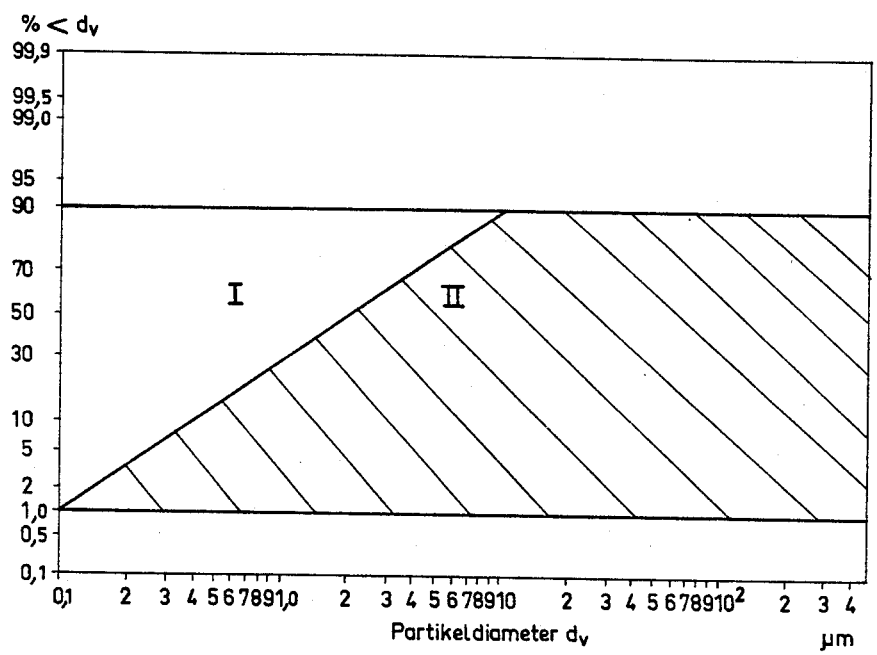

3,489,582
BINDING AGENT FOR PLASTER AND/OR MORTAR, AND MORTAR MIXTURES PRODUCED THEREFROM
Karl-Erik Lindgren and Kawe K. G. Andersson, Skovde, and Harry G. R. Johansson, Mariestad, Sweden, assignors to Aktiebolaget Gullhogens Bruk, Skovde, Sweden, a corporation of Sweden
Filed Mar. 25, 1966, Ser. No. 537,397
Claims priority, application Sweden, Mar. 25, 1965, 3,901/65
Int. Cl. C04b 7/00
U.S. Cl. 106—97                              11 Claims

ABSTRACT OF THE DISCLOSURE

A binding agent which can be used for the production of all required qualities of mortar by adding different quantities of sand. The agent is made up of hydraulic cement and from 5% to 50% by weight of a finely divided inorganic filler such as finely divided stone. Surface tension influencing air entraining agents may be added as also may consistency improving agents.

As a rule, calcite lime, hydraulic lime, masonry cement or portland cement and mixtures of these are used as cementing agents in plaster and mortar. Generally, these binding agents, or mixtures of several such agents, are mixed at the work site with the same proportions by weight of sand regardless of the qualities of mortar to be produced, i.e., the type of binding agent determines the quality of the mortar obtained. Because of this fact it is difficult at the work site to ensure that the proper binding agents or mixtures of such are always used so that the required strength of the mortar is obtained. The suitability of the plaster or mortar is determined partly by the characteristics of the fresh mortar, e.g. its consistency, workability, setting time and water retentivity in respect to the suction action of the base for the mortar after a certain time, and partly by the characteristics of the set mortar, e.g., its compressive strength, modulus of rupture, bonding strength with adjacent materials, the smoothness of the finished surface and the contraction of the mortar.

The present invention relates to binding agents for plaster and/or mortar which result in a mortar with extraordinarily good characteristics in the above named respects. One object of the invention is to produce all required mortar qualities at the work site while using only one binding agent and obtaining these qualities by merely adding different quantities of sand. This mode of operation has long been desired but it could not be realized. It has now been surprisingly found possible to obtain the stated object if in accordance with the present invention a binding agent is produced containing a hydraulic binding agent and an extremely finely divided stone material (filler), of a particle size measured in microns, or one-millionth of a meter, the international symbol μm. being used throughout to designate the micron unit as well as possibly a surface tension, air-entraining agent, the sizes of the stone material being finer than the curve specified by the following table.

Percent:                                         μm.
 90 ------------------------------------------   <10
 50 ------------------------------------------   <2
 30 ------------------------------------------   <1
 1  ------------------------------------------   <0.1

That is to say, the stone material included substantially lies in field I in the accompanying diagram. For certain purposes it is also possible, according to the invention, to include a somewhat coarser stone material having a particle size less than 500 μm., but it is necessary that the particle sizes be within field II in the diagram, and that a consistency improving agent of the cellulose derivative type be added. The extreme fineness of the stone material means that the amount of filler may be held sufficiently low to allow the set mortar's strength to meet the highest requirements and the workability of the mortar improved to a sufficient value to permit the mortar to be greatly diluted with aggregate material without worsening the characteristics.

The hydraulic cement may be portland cement, aluminous cement, slag cement, gypsum-slag cement etc. or mixtures thereof. The extremely fine stone material should be free from organic contaminants and may for example consist of finely ground limestone, gypsum, sand, quartzite, kieselguhr, powdered marble, powdered dolomite, powdered felspar, pyrophyllite, perlite, granite, gneiss, etc. The amount of fine stone material added to the hydraulic binding agent should be 5 to 50%, preferably 10 to 40%, calculated on the weight of the composition. Depending on the characteristics desired part of the fine material, suitably 0–95% and preferably 0–60%, may be replaced with a somewhat less fine material wherein the grain size must be such that at least 90% of the particles are less than 500 μm. This material lies within the dashed field II on the drawing. In case such a material is added however a consistency improving agent must also be added. The more the fine material of field I is replaced by the material from field II, the higher are the amounts of consistency improving agent required. Suitable consistency improving agents are water soluble cellulose derivatives such as ethyl-hydroxy-ethyl cellulose, hydroxy-ethyl cellulose, hydroxy-propyl cellulose, methyl cellulose, methyl-hydroxy-ethyl cellulose, etc. These may have a viscosity of 2000 to 100,000 centipoise measured in a 2% water solution at 20° C. according to Brookfield. The cellulose derivative may be mixed with various other agents, e.g. water soluble chloro phenol salts such as sodium trichloro phenolate, sodium tetrachloro phenolate and sodium pentachloro phenolate, which suitably may be added in amounts of 5–50% calculated on the weight of the cellulose derivative. Particularly advantageous effects are obtained with ethyl-hydroxy-ethyl cellulose combined with sodium pentachloro phenolate.

Tall oil or sulphonated or sulphated resins or fats may be used as surface tension influencing air-entraining agents. In certain cases it may also be suitable to add substances with only surface active effects, e.g. so-called tensides.

The amount of cellulose derivative is suitably 0.005–0.3%, preferably 0.01–0.1%, calculated on the weight of the composition.

The invention is illustrated in the following examples.

Examples 1–9 below give various suitable mixtures according to the invention wherein the amount of tall oil is chosen so that an air content of 15–20% is obtained in the finished plaster or mortar.

EXAMPLE 1

80% portland cement clinkers, 5% of gypsum, 5% of powdered limestone with 50% having a grain size of less than 2 μm., 10% of powdered limestone with 100% having a grain size finer than 500 μm. ground together with 0.03% of tall oil and 0.025% of ethyl-hydroxy-ethyl cellulose with a viscosity of 8000–12000 centipoise and 0.003% of sodium pentachloro phenolate in a ball mill.

EXAMPLE 2

| | Percent |
|---|---|
| Portland cement | 90 |
| Powdered limestone with 30% having a grain size finer than 1 μm. | 10 |
| Tall oil | 0.03 |

EXAMPLE 3

| | |
|---|---|
| Gypsum-slag cement | 80 |
| Powdered limestone with 50% finer than 2 μm. | 20 |
| Tall oil | 0.03 |

EXAMPLE 4

| | |
|---|---|
| Portland cement | 50 |
| Powdered quartz with 100% having a grain size finer than 500 μm. | 45 |
| Powdered quartz with 50% having a grain size finer than 2 μm. | 5 |
| Ethyl-hydroxy-ethyl cellulose with viscosity 8000–12000 centipoise | 0.06 |
| Tall oil | 0.03 |

EXAMPLE 5

| | |
|---|---|
| Portland cement | 85 |
| Finely ground sand with 50% having a grain size finer than 2 μm. | 5 |
| Finely ground sand with 100% having a grain size finer than 500 μm. | 10 |
| Ethyl-hydroxy-ethyl cellulose with viscosity 8000–12000 cp. | 0.03 |
| Sodium pentachloro phenolate | 0.003 |
| Tall oil | 0.03 |

EXAMPLE 6

Same as Example 5 but with methyl cellulose with viscosity 5000–10000 cp. and 0.003% sodium pentachloro phenolate.

EXAMPLE 7

Same as Example 5 but with hydroxy-ethyl cellulose with viscosity 5000–10000 cp. and 0.003% sodium pentachloro phenolate.

EXAMPLE 8

Same as Example 5 but with hydroxy-propyl cellulose with viscosity 3000–8000 cp. and 0.003% sodium pentachloro phenolate.

EXAMPLE 9

Same as Example 5 but with methyl-hydroxy-ethyl-cellulose with viscosity 4000–8000 cp. and 0.003% of sodium tetrachloro phenolate and also with 0.03% of calcium lignin sulphonate replacing the tall oil.

The binding compositions of Examples 1–9 may with advantage be used for the production of ready-to-use plaster and mortar, so-called dry mortar which is mixed with water at the work site.

In order to illustrate the effect of the invention, a binding agent according to Example 1 is compared with various presently used binding agent mixtures containing portland cement and powdered lime wherein the mortar is produced by mixing with standard sand having the following distribution of grain sizes.

| Percent: | mm. |
|---|---|
| 100 | <2 |
| 67 | <1 |
| 33 | <½ |
| 12 | <0.15 |
| 2 | <0.08 |

The workability of the mortar is given as the water retaining ability and the strength at an age of 28 days is determined according to standard methods. The results are set out in Table 1 below. In this table the qualities of the mortar are indicated by A through D, where A indicates the highest quality. These designation correspond to those prescribed by the Swedish Building Authorities ("Kungl. Byggnadsstyrelsens Anvisningar till Byggnadsstadgan 1960:1 (BABS 1960)"). The mortar designations also correspond to that given in BABS 1960, wherein K stands for lime and C stands for cement, and the numbers in order give the parts by volume of lime, cement, and sand.

TABLE 1

| Mortar quality | Mortar designation | Binding agent/sand ratio by volume | Water retaining ability, percent | Strength at 28 days kg./cm.$^2$ | |
|---|---|---|---|---|---|
| | | | | Compression | Flexing |
| A | KC 1:4:20 | 1:4 | 31 | 266 | 50 |
| B | KC 1:1:8 | 1:4 | 56 | 105 | 31 |
| C | KC 2:1:12 | 1:4 | 67 | 60 | 22 |
| D | K 1:5 | 1:5 | 80 | <5 | <2 |
| A | Example 1 according to the invention. | 1:2.5 | 76 | 218 | 46 |
| B | | 1:5 | 63 | 116 | 35 |
| C | | 1:7 | 56 | 83 | 28 |
| D | | 1:9 | 51 | 70 | 25 |

The table shows that the mortar according to the invention may be used in all classes of mortar quality by mixing in 2.5 to 9 times as much sand without losing the acceptable workability and strength. The water retentivity, which must not fall below 30%, is seen to lie very near the acceptable limit for KC 1:4:20 mortar while all mortars according to the invention show very good values. In standard class C one can reduce the amount of binding agent by 35% according to the invention. This quality class is the one normally used in moderate climate zones.

Examples 10–14 below show the water retaining ability and water separation for some mortar compositions according to the invention in comparison with standard mortar. All the mortars included tall oil as a surface tension affecting agent and air was entrained in amounts so that the air content measured in fresh mortar was 20% at a consistency of 20 Mo. After removing a sample and checking, the consistency has thus been adjusted with water to 20 Mo. The amount of tall oil required for adjusting the air content to 20% was about 0.03%. In some of the examples cellulose derivatives in combination with sodium pentachloro phenolate were also added. The finely divided stone material used in Example 12 corresponds to the limit curve in FIG. 1. The water retentivity is the mortar's ability to retain water when a fresh layer of mortar is subject to suction at a vacuum pressure of 50 mm. mercury for 60 seconds. For acceptance the mortar must always have a water retaining ability of at least 30%. Water separation is the bleeding of water due to segregation from the fresh mortar while the mortar is at rest. The amount of separated water is given in milliliters and is measured from 600 milliliters of mortar after two hours. Acceptable water separation is less than 10 milliliters. The consistency of the mortar has been measured in a so-called Mo-meter.

EXAMPLE 10

75% of portland cement clinkers and 5% of gypsum was ground together with 15% of finely ground powdered limestone with 100% having a grain size finer than 500 μm. and still finer powdered limestone with 90% finer than 10 μm. and also 0.025% of ethyl-hydroxy-ethyl cellulose with a viscosity of 8000–12000 centipoise in which was mixed 10% of sodium pentachloro phenolate calculated on the weight of the cellulose derivative. This binding agent composition is then mixed with various amounts of sand of standard quality and also water to form a mortar whose air content is adjusted by tall oil to 20%. After this the mortar's water retention and water separation was measured.

The following results were obtained:

| Parts by weight of binding agent: | Parts by weight of sand | Water retention, percent | Water separation, ml. |
|---|---|---|---|
| 100 | 350 | 84 | 0 |
| 100 | 650 | 75 | 0.9 |
| 100 | 900 | 56 | 1.2 |
| 100 | 1,150 | 32 | 1.3 |

EXAMPLE 11

Portland cement was mixed with 0.03% of tall oil and sand in various proportions to an air content of 20% at a consistency of 20 Mo. Thereafter the water retention and water separation for the mortar was measured. The following results were obtained:

| Parts by weight of binding agent: | Parts by weight of sand | Water retention, percent | Water separation, ml. |
|---|---|---|---|
| 80 | 350 | 41 | 7.6 |
| 80 | 650 | 16 | 13.1 |
| 80 | 900 | <10 | 13.2 |
| 80 | 1,150 | <10 | 15.8 |

EXAMPLE 12

80% of portland cement was mixed with 20% of finely ground powdered limestone with 90% having a grain size finer than 10 μm. and 0.037 of tall oil and also was diluted with sand of standard quality and water until a mortar was formed whose water retention and water separation was determined. The following result was obtained:

| Parts by weight of binding agent: | Parts by weight of sand | Water retention, percent | Water separation, ml. |
|---|---|---|---|
| 100 | 350 | 86 | 0 |
| 100 | 650 | 61 | 3.1 |
| 100 | 900 | 50 | 3.1 |
| 100 | 1,100 | 32 | 9.5 |

EXAMPLE 13

A standard mortar containing portland cement, hydrated lime, 0.03% of tall oil and various amounts of sand was prepared. Thereafter the water retention and water separation was determined at 20% air content and a consistency of 20 Mo. The following results were obtained:

| Parts by weight of hydrated lime | Parts by weight of portland cement | Parts by weight of sand | Water retention, percent | Water separation, ml. |
|---|---|---|---|---|
| 10 | 90 | 450 | 41 | 11.6 |
| 35 | 65 | 550 | 55 | 5.4 |
| 50 | 50 | 625 | 65 | 2.1 |
| 100 | 0 | 1,050 | 68 | 3.7 |

EXAMPLE 14

80% of portland cement, 15% of powdered limestone with 100% having a grain size finer than 500 μm., 5% of powdered limestone with 90% having a grain size finer than 10 μm. and 0.03% of tall oil were mixed with 10% of sodium pentachloro phenolate calculated on the weight of the cellulose derivative. 100 parts by weight of the compositions were diluted with 900 parts by weight of standard sand and also water to form mortar whose air content was adjusted to 20% at a consistency of 20 Mo.

Thereafter the water retention and water separation were determined and the following results were obtained:

| Cellulose derivative | Water retention, percent | Water separation, ml. |
|---|---|---|
| None | 37 | 8.7 |
| Ethylhydroxyethyl cellulose with a viscosity of 8,000–12,000 centipoise | 41 | 4.4 |
| Methyl cellulose with a viscosity of 5,000–10,000 centipoise | 40 | 1.5 |
| Hydroxyethyl cellulose with a viscosity of 5,000–10,000 centipoise | 30 | 4.6 |
| Hydroxypropyl cellulose with a viscosity of 3,000–8,000 centipoise | 52 | 0.0 |
| Methylhydroxyethyl cellulose with a viscosity of 4,000–8,000 centipoise | 41 | 0.8 |

The tests showed that if only portland cement was used as a hydraulic binding agent together with tall oil and sand, acceptable values for water retention and water separation were obtained only if the amount of sand lies in the neighbourhood of 3.5 times the amount of cement (Example 11). If very fine stone material is added according to the invention, acceptable values are obtained and the binding agent may be diluted with sand in large amounts without worsening the characteristics (Example 12). Acceptable values are obtained even if the portland cement is mixed in a known way with hydrated lime (powdered lime), but the strength is then very low in comparison with the compositions according to the invention. If a part of the extremely finely divided stone material is replaced by a somewhat less finely divided stone material and small amounts of cellulose derivative is added according to the present invention, one obtains very good values for water retention and water separation while at the same time obtaining good values of strength.

What we claim is:

1. A binding agent containing a hydraulic binding agent characterized in that it contains between 5 and 50% by weight of a finely divided stone material calculated on the weight of the composition; said finely divided stone material having a grain size finer than a curve specified by the following points: 90% <10 μm., 50% <2 μm., 30% <1 μm., and 1% <0.1 μm.; said binding agent being combinable with sand to produce a mortar having a water retaining ability of at least 30% when subjected to a vacuum pressure of 50 mm. of mercury for 60 seconds and a water separation of less than 10 milliliters from 600 milliliters of mortar after two hours.

2. The binding agent according to claim 1 wherein the binding agent contains 10–40% of a finely divided stone material, calculated on the weight of the composition.

3. A binding agent according to claim 1 characterized in that it also contains 0–95% of finely divided stone material, calculated on the amount of the finely divided stone material, of a somewhat coarser stone material with a grain size less than 500 μm., and a water soluble cellulose derivative as a consistency improving means in an amount of 0.005–0.3%, calculated on the weight of the composition.

4. A binding agent according to claim 3 wherein the amount of the finely divided stone material of somewhat coarser stone material is 0–60% calculated on the amount of finely divided stone material.

5. A binding agent according to claim 3 wherein the amount of cellulose derivative is 0.01–0.1% calculated on the composition's weight.

6. A binding agent according to claim 3 wherein the binding agent includes a water soluble salt of a chlorophenol.

7. The binding agent according to claim 3 containing 5–50% of a substance chosen from the group consisting of sodium trichloro phenolate, sodium tetrachloro phenolate and sodium pentachloro phenolate.

8. The binding agent according to claim 3 wherein the water soluble cellulose derivative is chosen from the group consisting of ethyl-hydroxy-ethyl cellulose, hydroxy ethyl cellulose, methyl cellulose, methylhydroxy ethyl cellulose and hydroxy propyl cellulose.

9. Binding agent according to claim 1 containing 50–90% of portland cement, 0–0.5% surface tension affecting air-entraining means, all calculated on the composition's weight.

10. A dry mortar containing a binding agent according to claim 1.

11. Ready-to-use mortar containing a binding agent according to claim 1, aggregate material and water.

References Cited

UNITED STATES PATENTS

| | | | |
|---|---|---|---|
| 2,420,144 | 5/1947 | Mark | 106—94 |
| 2,510,776 | 6/1950 | Gabrielson | 106—94 XR |
| 2,542,364 | 2/1951 | Schenker et al. | 106—94 XR |
| 2,680,113 | 6/1954 | Adler et al. | 106—94 XR |
| 2,892,727 | 6/1959 | MacPherson | 106—98 XR |
| 2,990,382 | 6/1961 | Wagner | 106—93 XR |
| 3,030,258 | 4/1962 | Wagner | 106—93 XR |
| 3,090,693 | 5/1963 | Kelly et al. | 106—98 XR |
| 3,215,549 | 11/1965 | Ericson | 106—93 XR |
| 3,243,307 | 3/1966 | Selden | 106—93 |

TOBIAS E. LEVOW, Primary Examiner

H. M. S. SNEED, Assistant Examiner

U.S. Cl. X.R.

106—93, 94